United States Patent
Fowler et al.

[19]

[11] Patent Number: 6,104,979
[45] Date of Patent: Aug. 15, 2000

[54] INTEGRATED SWATH GUIDANCE SYSTEM

[75] Inventors: David A. Fowler, Elgin; David L. Hirsch, Austin; Clarence W. Fowler, Elgin; David L. Hindman, Austin; Charles L. Ladwig, IV, Round Rock; Gerald D. Powell, Austin, all of Tex.

[73] Assignee: Starlink, Inc., Austin, Tex.

[21] Appl. No.: 08/873,058

[22] Filed: Jun. 11, 1997

[51] Int. Cl.[7] .................................................. G01C 21/00
[52] U.S. Cl. .......................... 701/208; 701/200; 701/207; 701/213; 340/988
[58] Field of Search .................................... 701/200, 207, 701/208, 213; 340/988, 990, 995; 56/10.2 F, 10 R, 10.2 A

[56] References Cited

U.S. PATENT DOCUMENTS 5,644,139  7/1997  Allen et al. .............................. 250/557
5,887,269  3/1999  Brunts et al. ............................ 701/208

*Primary Examiner*—William A. Cuchlinski, Jr.
*Assistant Examiner*—Yonel Beaulieu
*Attorney, Agent, or Firm*—Fulbright & Jaworski L.L.P.; Patrick Stellitano

[57] ABSTRACT

An integrated guidance system for use in swath guidance applications combines the display of swath navigation information with swath guidance system information. A processor receives information from an external positioning system such as a Global Positioning System receiver and generates course correction data derived from swath parameters selected by the user from a displayed menu of options using a control interface that is integrated with the display and processor or is located externally. The swath navigation information is displayed graphically and numerically. The entire apparatus is compact and mountable within the operative view of the user as he operates the equipment to be guided, thereby reducing hazard and navigational error.

25 Claims, 3 Drawing Sheets

BACK AND FORTH PATTERN

RACETRACK PATTERN

SQUEEZE PATTERN

INTEGRATED SWATH GUIDANCE SYSTEM

TECHNICAL FIELD

This invention relates to apparatus for display of swath navigation information and guidance system information.

BACKGROUND OF THE INVENTION

Swath guidance systems are used in applications where equipment must be moved across the surface of the ground or water in a precise path. For example, agricultural equipment for spraying crops would be guided to traverse parallel paths (swaths) of equal width across a field. Swath guidance systems display information to assist the equipment operator in keeping his equipment on the correct swath. For such applications accuracy, update speed and ease of system use are very important.

In the current state of the art, direction error information is typically displayed by a "light bar" which consists of a row of lights which illuminate from the center of the row to the right or to the left to indicate the direction and extent of deviation from the desired swath. Direction error information is derived by an externally located computer from position data received by an external positioning system such as a Global Positioning System (GPS) receiver. Some systems also provide a separate control panel to allow the user to select various options.

Several problems are associated with the current state of the art systems. Such systems are not compact and the user must take his eyes away from the task of driving the equipment in order to set device options or view system indicators other than the light-bar. This creates a safety hazard and also can introduce wasteful navigational deviations. Also, current systems do not provide easy means to specify a desired path from which direction error can be determined.

Thus, a need exists for an apparatus for displaying swath navigation information and guidance system information that is compact, can be mounted within the operative view of the user, and provides easy means for swath specification.

SUMMARY OF THE INVENTION

An object of the present invention is, therefore, to provide an apparatus for displaying swath navigation information and guidance system information that is compact, can be mounted within the operative view of the user, and provides easy means for swath specification.

The present invention is an integrated system which combines the display of swath navigation information with the display of system information, and is mounted within the operative view of the user while he is operating the equipment to be guided. The invention also provides the user a way to control the display and select system options without taking his eyes off his task.

The invention solves the problems of unwanted navigational deviations and unsafe conditions created by conventional display methods that require the operator to look away from his task to view the display of system information or to input control commands.

Another advantage of the invention is the ease with which a user may specify the desired swath pattern.

Another advantage to the invention is the reduction in manufacturing costs achieved by the elimination of separate packaging and interfacing of separate devices for control and information display.

The present invention is comprised of three major components: a display device, a processor, and a control interface. These components are integrated into one unit mounted in the operative view of the user as he performs his primary task. Optionally, a separate control interface can be provided for applications where the user can not safely move his hands to the proximity of the display.

The processor receives position signals from an external positioning system and processes this data to generate swath navigation information for display to the user. The display device displays swath navigation information and system information. Swath navigation information includes information which indicates the direction and extent of deviation from the desired swath to assist the operator in returning to the correct swath position. The system information displayed may include external positioning system information, user-selectable options and user inputs. The control interface receives inputs from the user, such as desired swath pattern and swath width, and in response, generates appropriate signals to be processed by the processor. The processor may also send control signals to the external positioning system for control of external positioning system operation. Further, additional input/output interfaces may be provided to receive signals from other external systems for storage or processing and for transmitting signals to other external systems.

These and other features, aspects, and advantages of the present invention will become better understood with reference to the following description, appended claims, and drawings.

Table 1 is a table of representative displays of information provided in a preferred embodiment, and includes a functional description of the displays.

DETAILED DESCRIPTION OF PREFERRED EMBODIMENTS

Figure 1:
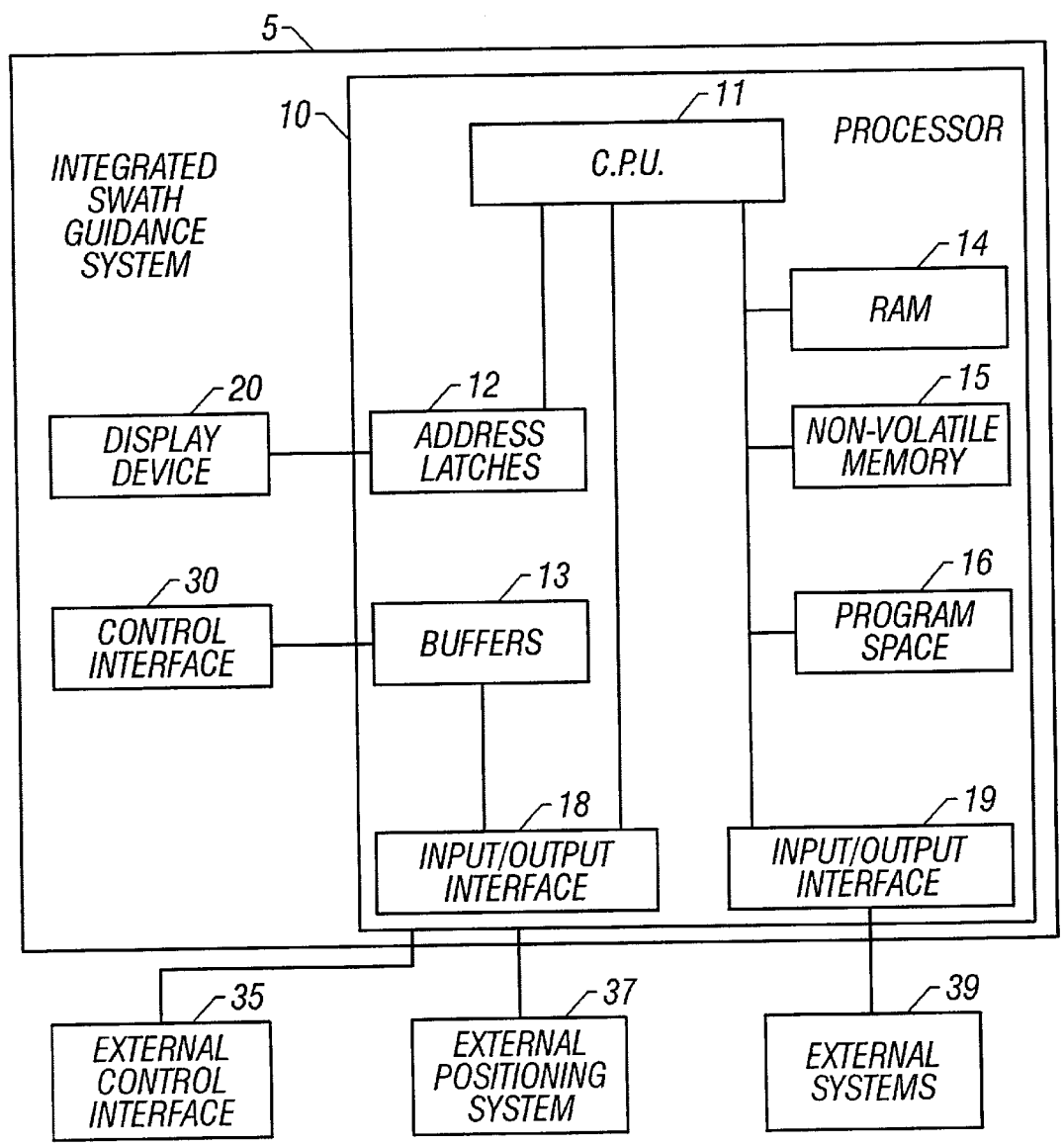
FIG. 1 is a block diagram of a preferred embodiment of the present invention.

Referring to FIG. 1, a preferred embodiment of the guidance system 5 comprises a processor 10, a display device 20, and a control interface 30, integrated into one unit. Additionally, a separate external control interface 35 can be connected to provide access to the user in situations where he can not move his hands to control interface 30. In an alternative embodiment, processor 10 and display device 20 could be integrated into one unit, and an external remotely located control interface 35 would be provided.

In a preferred embodiment processor 10 comprises a central processing unit 11, address latches 12, buffers 13, random access memory 14, non-volatile memory 15, program space 16, and an input/output interface 18. The input/output interface 18 provides means for connecting the external positioning system 37 and external control interface 35 to the guidance system 5. In the preferred embodiment, input/output interface 18 is a common RS232 asynchronous serial interface which operates at 4800, 9600 or 19200 baud. In an alternative embodiment, an auxiliary input/output interface 19 is included to provide means for receiving signals from other external systems 39 to be stored and/or processed by processor 10, and to provide means for transmitting signals to other external systems 39.

Processor 10 controls the operation of the guidance system 5 in response to various user input commands and externally provided signals in accordance with encoded instructions stored in program space 16. In the preferred embodiment, processor 10 comprises a conventional, commercially available monolithic integrated circuit controller such as a Dallas Semiconductor 80c520, an 8-bit microcontroller comprising 16 k of internal program space. This device provides sufficient functionality and program space, as well as an appropriate input/output interface. The selection of a suitable controller or microprocessor for any given application is a matter of engineering design choice given the particular application, and a number of suitable products are commercially available. Further, additional external memory could be provided.

Likewise, providing an instruction set and control software for processor 10 is a straightforward matter given the detailed description of the control and interface requirements for the guidance system described herein, and consequently a program listing for the preferred embodiment need not be provided herein.

Further, although in the preferred embodiment processor 10 comprises a microcontroller, other equivalent means for implementing the processor exist, including circuitry and programmable logic arrays.

In the preferred embodiment, display device 20 is comprised of an array of light emitting diodes for displaying alpha-numeric symbols. In a preferred embodiment three commercially available 8 character dot matrix LED displays are combined to give 24 character display capability. Use of light emitting diodes make it possible to see the information displayed even in bright sunlight. The display brightness is controlled using control interface 30 or 35. Display device 20 is coupled to processor 10 through commercially available address latches 12.

Control interfaces 30 and 35 are comprised of appropriate user actuated switches and associated circuitry, wherein the switches may be actuated by depressible buttons. In the preferred embodiment, control interface 30 or 35 comprises three buttons, and is coupled to processor 10, through buffers 13, which are ordinary commercially available CMOS logic buffers. Alternatively, external control interface 35 could include switches located in more than one remote location connected electrically to the input/output interface 18.

Processor 10 receives position signals from an external positioning system 37, typically a Global Positioning System (GPS) receiver. The external positioning system 37 is not part of the present invention. Processor 10 compares this position signal with the position desired by the user and generates swath navigation information to be displayed by display device 20. The desired position is determined by processor 10 from the swath parameters selected by the user using control interface 30 or 35. The swath parameters include the swath reference points described below, the swath pattern, and swath width.

Table 1 is a table of representative displays of information provided in a preferred embodiment, and includes a functional description of the displays.

Figure 2:
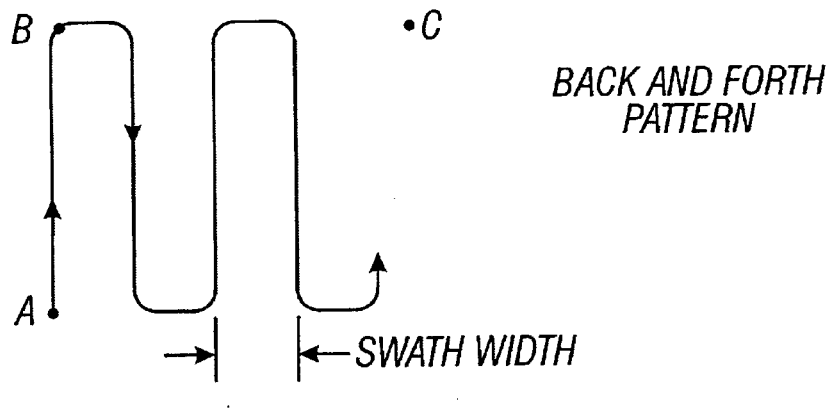
FIG. 2 illustrates swath patterns facilitated by a preferred embodiment.
Figure 2:
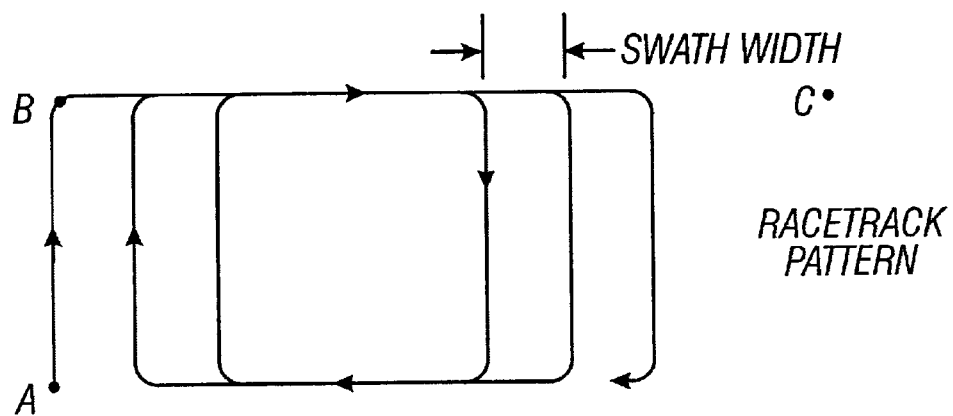
Figure 2:
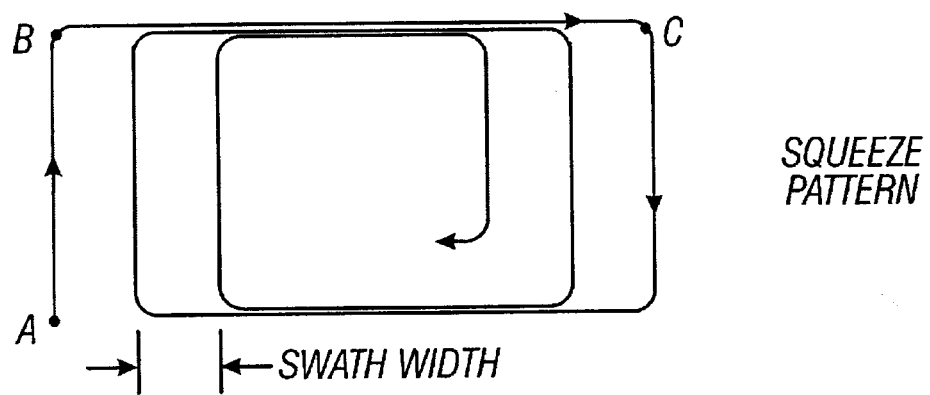

The swath pattern options are displayed by display device 20 in a menu-selectable format. A display shows the current swath width and pattern. Table 1, Row 11. Menus selected through control interface 30 or 35 allow the user to select the desired pattern and width. Table 1, Rows 12, 13. In the preferred embodiment, three basic swath pattern options are available to be chosen by the user: back and forth, racetrack and squeeze. These patterns are illustrated in FIG. 2. After selecting the pattern and swath width the user inputs the swath reference points. First, he records his starting position by depressing the appropriate button on control interface 30 or 35. Table 1, Row 3. The starting point is shown as point A in FIG. 2. The user then traverses a straight line to the opposite side of the area to be covered and records his endpoint, Table 1, Row 4, FIG. 2, point B, forming a reference line AB. Processor 10 determines the extent to which subsequent swaths are parallel to this reference line. If the back and forth pattern is selected, the user then turns left or right and records a point, Table 1, Row 5, FIG. 2, point C, to indicate on which side of the reference line subsequent swaths will be made. If the racetrack or squeeze pattern is selected, the user then turns left or right, travels to the far boundary of the area to be covered and records that point, Table 1, Row 5, FIG. 2, point C. Processor 10 then computes the total number of swaths to be traversed to cover the specified area. The user follows the selected pattern as processor 10 tracks the currently traversed swath and detects deviation from the required position. The swath pattern and width selected by the user is stored in non-volatile memory 15. Table 1, Row 14. In a preferred embodiment non-volatile memory 15 is a commercially available serial EEPROM such as an Atmel 93C66. Optionally, the user can clear his swath parameter selections and start a new swath parameter entry. Table 1, Row 7.

Figure 3A:
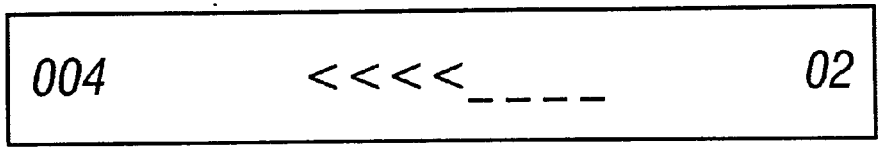
FIG. 3 illustrates two displays presented by a preferred embodiment.

FIG. 3a shows a format of a swath navigation information display. Display device 20 displays a number to the left indicating the distance from the desired line of travel. This distance is also indicated by the number of arrows starting from the center of the display and pointing toward the correct swath. The angular deviation from the correct swath path is indicated by dashed lines. As the user drives toward the correct swath the number of arrows decreases. As the user turns parallel to the desired path the number of dashes decreases. In this way, the display helps the user return to course without overshoot and oscillation. Two arrows pointing in opposite directions provide on-course indication. The current swath number is indicated on the right. Other navigation information displayed is shown in Table 1, Row 9.

Figure 3B:
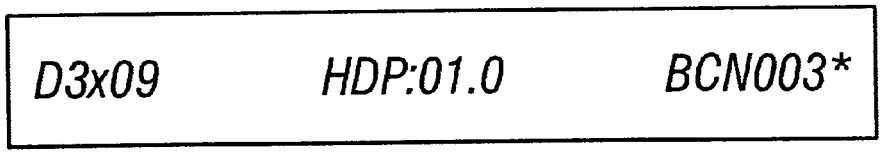

The user may also use control interface 30 or 35 to cause external positioning system information to be displayed. This information is developed by processor 10 from system information signals received from the external positioning system 37. An external positioning system information display format for a GPS receiver is shown in FIG. 3b. The leftmost display position contains a letter which indicates the mode of operation of the receiver. For example, "D" would indicate Differential GPS operation. The next two display positions are occupied by a number followed by an "X". The number indicates the dimensionality of the GPS position solution. The next two display positions are occupied by a number which indicates the number of GPS satellites used by the GPS receiver to compute the position solution. The display also shows the horizontal dilution of precision and the age of data. Other suitable display formats could be provided for other external positioning systems.

Display device 20 also displays a warning indication when the external positioning system 37 lacks the desired performance or is operating in the wrong mode. The warning indicator is displayed as a letter in the rightmost display position, each letter associated with a particular warning. For example, "G" indicates a GPS receiver mode problem, "A" indicates a high horizontal dilution of precision, and "D" indicates an age of data greater than 15 seconds. Other possible display formats could be readily provided if desirable.

The asterisk "*" is displayed whenever the user may switch directly from the present display to a sub-menu display from which the user may return to the present display. The user moves from one display to another by actuating the appropriate switch or button on control interface 30 or 35.

In a preferred embodiment, processor 10 also transmits external system control signals to external positioning system 37 to control operation of external positioning system 37. For example, the external system control signals could be used to cause external positioning system 37 to transmit one of a plurality of information sets provided by external positioning system 37, (e.g., GGA and VTG for GPS), and further control the rate of data transmission. External system control signals may be internally generated by processor 10 or generated by processor 10 in response to selections made by the user from control interface 30 or 35. Options for external positioning system control can be displayed in menu-selectable format by display device 20.

Figure 4:
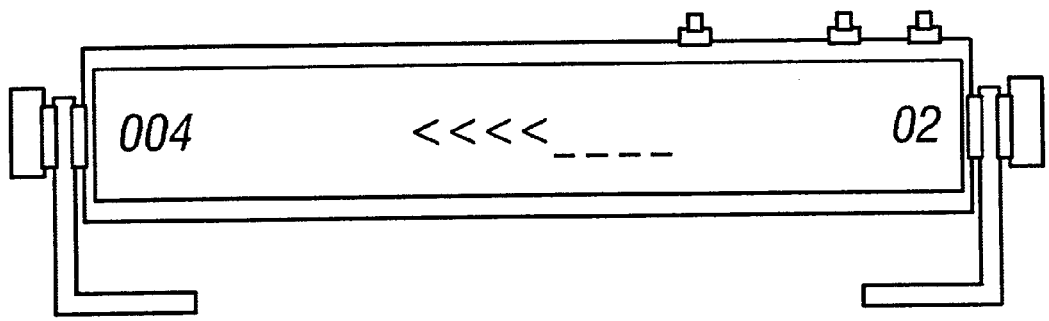
FIG. 4 is a drawing of the external appearance of a preferred embodiment.

A preferred embodiment of the apparatus is shown in FIG. 4, where it is encased in a rugged aluminum structure and swivel-mounted to allow the device to be tilted for optimum view of the display.

Clearly, it would be obvious to a person of ordinary skill in the art to which this invention pertains that changes can be made in the above-described details without departing from the underlying principles of the present invention. A description of a particular embodiment does not determine the scope of an invention. Rather, the scope of the present invention is determined by the following claims.

We claim:

1. An integrated swath guidance system comprising:
   a processor for receiving information from an external positioning system indicative of a navigational path traversed by a vehicle, computing swaths derived from a user-selected predefined swath pattern, and for computing a deviation of the navigational path of the vehicle from the computed swath; and
   a control interface coupled to said processor to enable the user to select said predefined swath pattern;
   wherein said processor computes a number of parallel swaths derived from said predefined swath pattern and a user-specified swath width.

2. The system of claim 1, further comprising a display device for producing a display indicative of said computed deviation of the navigational path of the vehicle from the computed swath.

3. The system of claim 2, wherein said display device is mountable within the operable view of a user of said vehicle while performing a task of navigating the vehicle.

4. The system of claim 1, wherein said control interface is mountable in a position to be operated by a user of said vehicle while performing a task of navigating the vehicle.

5. The system of claim 1, further comprising a display device that displays the number of the parallel swath currently being traversed by said vehicle.

6. The system of claim 1, wherein said processor computes parallel swaths based upon a swath coverage area derived from user-specified geographical points which define said coverage area.

7. The system of claim 1, wherein said computed deviation is indicative of the linear distance of the vehicle from a swath.

8. The system of claim 1, wherein said computed deviation is indicative of the angle between the current trajectory of the vehicle and a swath.

9. The system of claim 7, wherein said computed deviation is also indicative of the angle between the current trajectory of the vehicle and a swath.

10. The system of claim 2, wherein said display device farther produces a display indicative of external positioning system information received from said external positioning system.

11. The system of claim 1, wherein said control interface further enables the user to control operation of said external positioning system.

12. The system of claim 2, wherein said display produces a display indicative of user-selectable swath patterns.

13. A method for providing swath navigation information indicative of a deviation of a navigational path traversed by a vehicle from a desired swath, comprising the steps of:
   receiving information from an external positioning system indicative of the navigational path traversed by the vehicle;
   computing the desired swath from a user-selected predefined swath pattern; and
   computing the deviation of the navigational path traversed by the vehicle from the computed swath; and
   computing a number of parallel swaths derived from said predefined swath pattern and a user-specified swath width.

14. The method of claim 13, further comprising the step of producing a display indicative of said computed deviation of the navigational path of the vehicle from the computed swath.

15. The method of claim 14, wherein said display is produced within the operable view of a user of said vehicle while performing a task of navigating the vehicle.

16. The method of claim 13, further comprising the steps of enabling the user to select a predefined swath pattern.

17. The method of claim 13, further comprising the step of enabling the user to select a predefined swath path while performing a task of navigating the vehicle.

18. The method of claim 13, further comprising the step of displaying the number of the parallel swath currently being traversed by said vehicle.

19. The method of claim 13, further comprising the step of computing parallel swaths based upon a swath coverage area derived from user-specified geographical points which define said coverage area.

20. The method of claim 13, wherein said computed deviation is indicative of the linear distance of the vehicle from a swath.

21. The method of claim 13, wherein said computed deviation is indicative of the angle between the current trajectory of the vehicle and a swath.

22. The method of claim 20, wherein said computed deviation is also indicative of the angle between the current trajectory of the vehicle and a swath.

23. The method of claim 14, further comprising the step of producing a display indicative of external positioning system information received from said external positioning system.

24. The method of claim 13, further comprising the step of enabling the user to control operation of said external positioning system.

25. The method of claim 14, further comprising the step of producing a display indicative of user-selectable swath patterns.

* * * * *